United States Patent [19]
Shashidhar et al.

[11] Patent Number: 5,948,316
[45] Date of Patent: Sep. 7, 1999

[54] LIQUID CRYSTAL COMPOSITION AND ALIGNMENT LAYER

[75] Inventors: Ranganathan Shashidhar, Springfield; Brian Peek, Annandale; Banahalli R. Ratna, Springfield; Jeffrey M. Calvert, Alexandria; Joel M. Schnur, Burke, all of Va.; Mu-San Chen, Ellicott City, Md.; Renate J. Crawford, Alexandria, Va.

[73] Assignees: The United States of America as represented by the Secretary of the Navy, Washington, D.C.; Geo-Centers, Inc., Newton Centre, Mass.

[21] Appl. No.: 08/559,318

[22] Filed: Nov. 15, 1995

Related U.S. Application Data

[62] Division of application No. 08/375,997, Jan. 20, 1995, Pat. No. 5,578,351.

[51] Int. Cl.⁶ .............................. C09K 19/56; C07F 7/04
[52] U.S. Cl. ................. 252/299.4; 556/420; 556/421; 556/428
[58] Field of Search ................ 252/229.4; 556/428, 556/420, 421

[56] References Cited

U.S. PATENT DOCUMENTS

| | | | |
|---|---|---|---|
| 4,316,041 | 2/1982 | Totten et al. | 556/420 |
| 4,674,842 | 6/1987 | Van De Venne | 359/54 X |
| 5,133,895 | 7/1992 | Ogawa et al. | 252/299.4 |
| 5,342,737 | 8/1994 | Georger, Jr. et al. | 430/324 |
| 5,391,463 | 2/1995 | Ligler et al. | 430/272 |
| 5,426,009 | 6/1995 | Coates et al. | 430/20 |

FOREIGN PATENT DOCUMENTS

| | | |
|---|---|---|
| 0 312 100 | 4/1989 | European Pat. Off. . |
| 0 476 543 A2 | 3/1992 | European Pat. Off. . |
| 0 601 895 A1 | 6/1994 | European Pat. Off. . |
| 0 612 755 A1 | 8/1994 | European Pat. Off. . |
| 26 04 293 | 8/1977 | Germany . |
| 54-098637 | 8/1979 | Japan . |
| 5-009721 | 1/1981 | Japan . |

OTHER PUBLICATIONS

Ogawa et al., "Control of Pretilt Angles of Liquid Crystal Molecules in a Liquid Crystal Cell Using a Chemically Adsorbed Monolayer as an Alignment Film", *Japanese Journal of Applied Physics*, vol. 29, No. 9, Sep., 1990, pp. L 1689–L 1692.

*Primary Examiner*—C H Kelly
*Attorney, Agent, or Firm*—Darryl P. Frickey; Peter F. Corless

[57] ABSTRACT

A surface for the alignment of liquid crystals containing directionally-linked groups.

6 Claims, 13 Drawing Sheets

13F

8C

3FP

C3

ABTE

APS

EDA

DETA

ABTE

CROSSED POLARIZERS, LC DIRECTOR
PARALLEL TO POLARIZER

EDA

CROSSED POLARIZERS, LC DIRECTOR
PARALLEL TO POLARIZER

DETA

CROSSED POLARIZERS, LC DIRECTOR
PARALLEL TO POLARIZER

 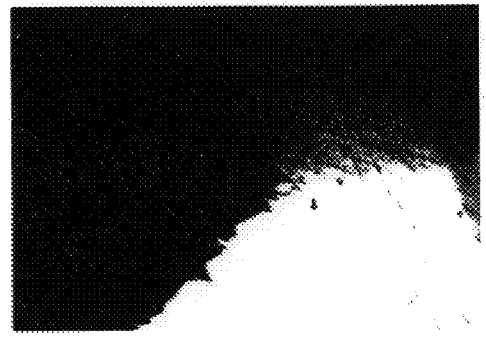
LC DIRECTOR 45° TO POLARIZER
CROSSED POLARIZERS
FIG.8A
LC DIRECTOR PARALLEL TO POLARIZER
CROSSED POLARIZERS
FIG.8B Bare ITO substrates, partly treated with DP layer Between parallel polarizers Bare ITO substrates, partly treated with DP layer Between crossed polarizers Substrates: ITO with 690 Å of SiO₂, partially treated with DP layer Between parallel polarizers Substrates: ITO with 690 Å of SiO₂, partially treated with DP layer Between crossed polarizers

LIQUID CRYSTAL COMPOSITION AND ALIGNMENT LAYER

This is a Division of application Ser. No. 08/375,997 filed on Jan. 20, 1995, U.S. Pat. No. 5,578,351.

BACKGROUND OF THE INVENTION

1. Field of the Invention

The present invention relates to a new directionally-linked surface useful for the alignment of liquid crystals. Methods of preparing this new surface are also described, as is a preferred method wherein a polymerizable self-assembled and high resolution-patternable sorbed layer is polymerized by polarized radiation.

2. Discussion of the Prior Art

Flat panel liquid crystal (LC) display devices typically require substrates which provide for the uniaxial orientation of liquid crystalline molecules. Currently, such alignment is achieved by initially spin coating a polymer (polyamide, polyimide, etc.) on a substrate followed by mechanical rubbing of the polymer surface with cotton, rabbit fur, etc. This technique has inherent problems, however, in that it is difficult to obtain a predictably uniform alignment over large areas. In addition, rubbing creates both charges and dust. Charges lead to the failure of LC devices due to, e.g., shorting of conducting surfaces, etc., and dust can provide defect sites. There is, therefore, a current industrial need for a surface that promotes uniaxial liquid crystal alignment (i.e., both planar alignment (an alignment orientation where the long axis [or average director] of the liquid crystal is not perpendicular to the plane of the substrate surface), and homeotropic alignment, where liquid crystal molecules are perpendicular to the substrate surface) without the need to mechanically rub the surface of a substrate, and for a simple technique for producing such a surface. Colorless substrates that align liquid crystalline molecules are also desirable for high contrast applications, etc.

Current approaches for addressing the problems encountered with rubbed surfaces include the coating of Langmuir-Blodgett (LB) layers on substrates, and the polymerization or irradiation of substrates that have been coated with polymers with polarized light.

In the LB film approach, major difficulties are encountered which have not yet been overcome: (i) it is very difficult to scale-up an LB process for manufacturing purposes, and (ii) a useful aligning layer is fabricated only via the layer-by-layer deposition of monolayers onto a substrate at the air-water interface of an LB trough. Since the monolayer present at the air-water interface in an LB trough is not in its thermodynamically stable state, the aligning layer obtained does not have long term mechanical and thermal stability.

LB layers also generally contain inhomogeneities or domains of defects within the plane of the film. This makes it difficult to obtain the uniaxial alignment of a liquid crystal compound over a large area. Moreover, LB films are known to have a considerable degeneracy with regard to the tilt of the LB-forming molecules within the plane of the film. As a consequence, it is not possible to obtain specific pre-tilt directions at the substrate surface.

Hercules (U.S. Pat. No. 5,032,009; U.S. Pat. No. 4,974,941; U.S. Pat. No. 5,073,294; Nature, Vol 351, 49 May 1991; Liquid Crystals, Vol. 12, No. 5,869, 1992; Newsletter of the Int. Liq. Crystl. Soc., ("Liquid Crystals Today"), Vol. 4, No. 2 1994, all incorporated herein by reference) has reported the alignment of liquid crystals optionally containing dyes with polarized light and the preparation of a surface made of an isomerizable dye which is first dispersed in a polymer and subsequently irradiated with polarized light. Neither the liquid crystal itself, dye, nor host polymer is covalently bound to the substrate, and the aligning surface is unstable: heat and/or subsequent irradiation changes or erases any initially obtained orientation aligning effect.

Schadt et al (*Jpn. J. Appl. Phys.*, Vol. 31, Pt 1, No. 7, p. 2155 (1992); EP 525,477; EP 525,473 and EP 525,478, all incorporated herein by reference) has also reported aligning surfaces prepared by the irradiation of polymers having, attached to the polymer backbone, pendant polymerizable groups, using polarized light. These surfaces require prepolymerization, however, and, like those described above, are not covalently bound to a substrate surface. Moreover, when polymer layers like those of Schadt and Gibbons are made thin to lower the driving voltage, pinholes arise which cause defects and shorts.

Finally, Ichimura (Abstract from the Tawiguchi Conference, (Japan), 1994, incorporated herein by reference) has used polarized light to orient polymers bearing side chain azobenzenes. The polymers were applied to substrates using an LB technique and a spin-coating technique, and showed alignment of liquid crystals in contact therewith. However, these films, like those of Schadt and Gibbons, are not bound to the substrate surface, and they suffer from the general drawbacks discussed above for such films as well as those discussed regarding LB films.

Thus, there remains a need for a tough new, non-rubbed, non-LB based alignment surface which can be easily produced and used in liquid crystal devices which require alignment layers. The present invention provides such a surface.

OBJECTS OF THE INVENTION

Accordingly, it is one object of the present invention to provide a surface for the uniaxial planar alignment, homeotropic alignment, etc., of liquid crystalline molecules in contact therewith, the pre-tilt angle $\theta$ of aligned liquid crystals varying from $0° \leq \theta \leq 90°$ (measured as the angle the long axis (director) of the liquid crystalline molecule makes with the surface plane of the substrate).

It is another object of the present invention to provide liquid crystal display devices, spatial light modulators, phase modulators, non-linear optical devices, etc., comprising substrates which provide uniaxial planar alignment, homeotropic alignment, etc., of liquid crystalline molecules in contact therewith.

It is another object of the present invention to provide a simple method for producing a surface that provides for the uniaxial planar alignment, homeotropic alignment, etc., of liquid crystalline molecules in contact therewith.

It is another object of the present invention to provide an alignment surface for liquid crystals that is colored or colorless, that provides for the control of the pretilt angle $\theta$ of liquid crystal molecules in contact therewith from 0° to 90°, and which provides uniaxial planar alignment (meaning that for all $\theta$s other than 0° and 90° all or substantially all of the liquid crystalline molecules in contact with the surface tilt in the same direction.

These and other objects, which will become apparent after a review of the following detailed description, have all been achieved by the inventors' discovery of a surface containing anisotropic chemical and, it is thought, geometric features which guide liquid crystalline molecules in contact therewith in preferred orientations and with tilt angles $\theta$ of from 0° to 90°.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8 shows the liquid crystal alignment obtained with a plain glass cell having a directionally polymerized surface thereon. Both directionally polymerized and unpolymerized regions are shown. The LC molecules are aligned (dark region) in a uniform planar orientation in the polymerized regions;

DETAILED DESCRIPTION OF THE PRESENT INVENTION

The present inventors have discovered that an anisotropic "sorbed" (meaning chemisorbed, adsorbed, absorbed, etc.) directionally linked layer produces a surface having superior alignment properties. Their discovery includes the formation of layers on a substrate surface by chemisorption, optionally followed by chemical modification of the chemisorbed layer by attachment of a directionally linkable group thereto, and, finally, creation of an anisotropic surface by directional linking using, e.g., polarized radiation. This process creates an anisotropic surface aligning layer that provides for the uniform planar alignment of LC molecules without any rubbing.

The invention alignment surface is preferably a directionally-linked layer of molecules adsorbed, absorbed or chemically bonded to a substrate. By "layer" the inventors mean more than one molecule, and the invention is not limited to a monolayer, a continuous layer, etc. Covalent bond formation of the layer molecules to the substrate is preferred (i.e., chemisorption). For example, an —OH group on the surface of a glass substrate provides a site for the attachment of a chemisorbable molecule. Chemisorption therefore, as used herein provides an aligning layer with long-term thermal and mechanical stability. See FIG. 1 for the chemisorption of silanes.

In particular, the present invention alignment surface comprises a directionally linked layer with anisotropic chemical (i.e., molecular) and, it is believed, geometric features. These features are provided by a sorbed (i.e., an adsorbed, absorbed, preferably chemisorbed, etc.) layer or layers which comprise one or more compounds having the following general formula:

$$[X]_m\text{—}[S]_n\text{—}[P]_o \qquad (1)$$

where X is a chemical functional group capable of adsorption, absorption or chemisorption to a surface or substrate, S is a spacer and P is a directionally linkable group.

X is a group that sorbs to surfaces, particularly surfaces and substrates used in devices requiring aligned liquid crystals (e.g., glass, ITO-coated glass, polymer surfaces, diamond surfaces, microvoid-containing materials, silicone wafers optionally comprising a predetermined pattern, silicon wafers patterned after adsorption, absorption or chemisorption of the above-described compounds, etc.). Of course, substrates other than those currently used in liquid crystalline devices may also be coated with the compounds described above. Examples of useful surfaces include gold, silver, copper, mirror surfaces, $MgF_2$, chromium, platinum, palladium, mica, aluminum oxide, aluminum, amorphous hydrogenated silica, gallium arsenide, polysilicon, sulfides including cadmium sulfide, seleides, silver bromide films, oxidized metal surfaces, metal surfaces, plastic (polymer) surfaces, etc.

Figure 1:
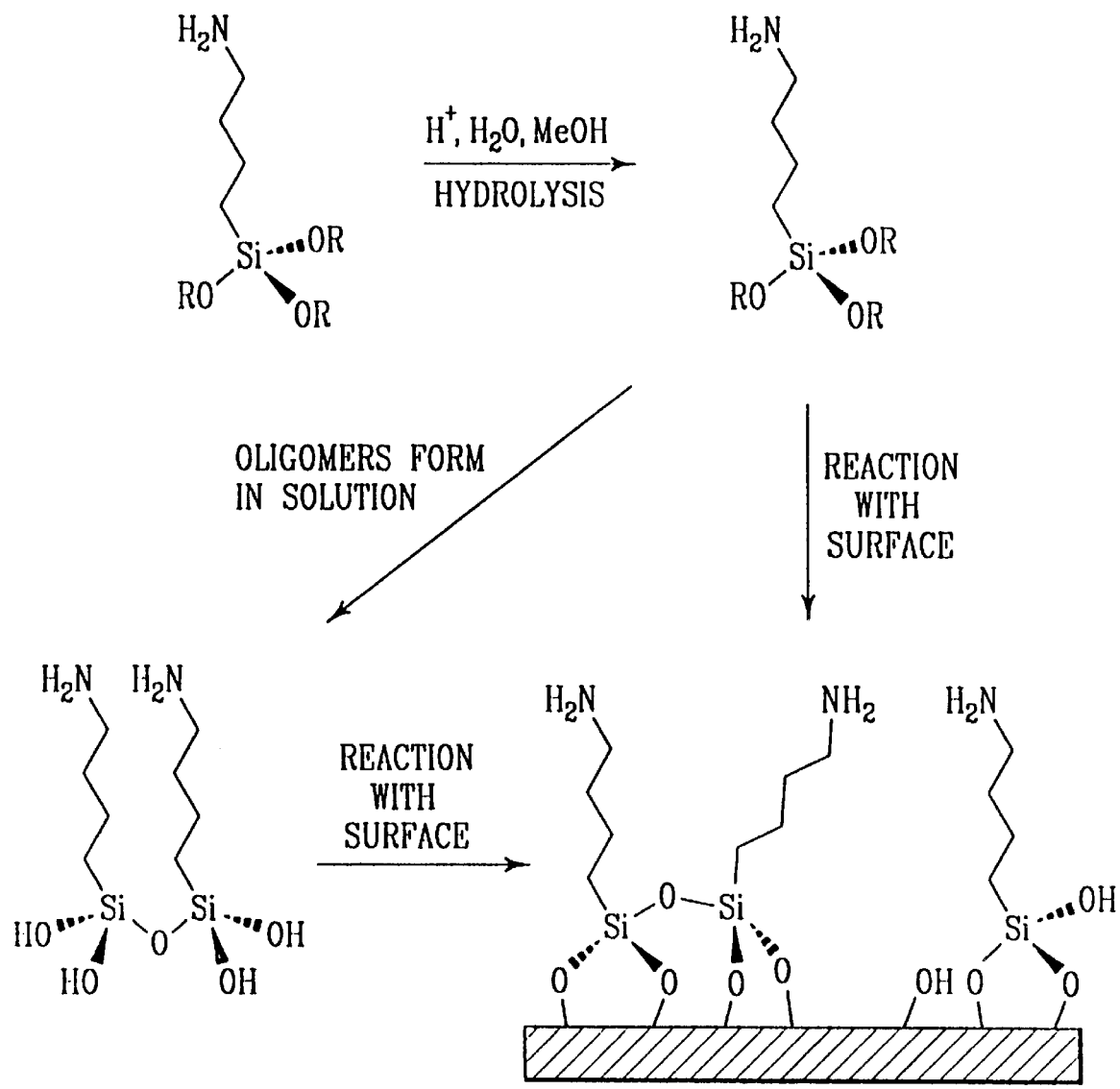
FIG. 1 is a schematic representation of one process of effecting chemisorption of silane molecules onto a surface. A substrate is dipped in a solution containing silane molecules. The silanes covalently attach to the surface.
Figure 2A:
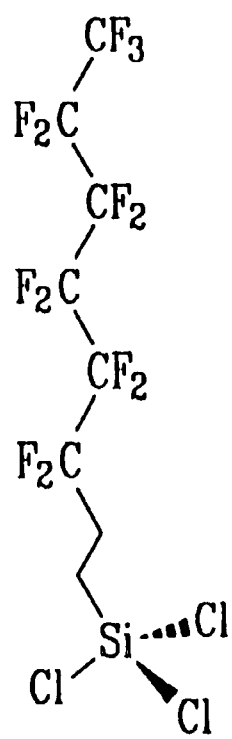
FIGS. 2a, b, c and d shows the structures of non-directionally polymerized hydrophobic silanes referred to in the specification. When chemisorbed on a surface, these silanes promote a perpendicular (homeotropic) alignment of LC molecules.
Figure 2B:
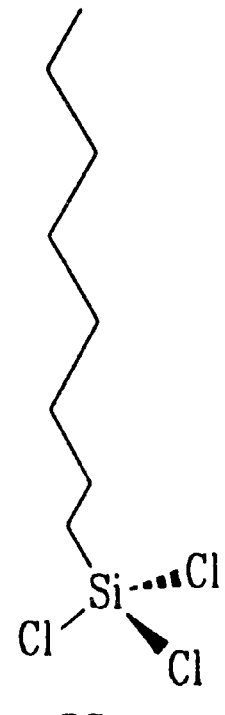
Figure 2C:
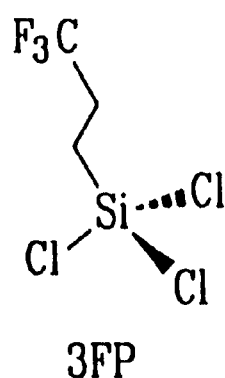
Figure 2D:
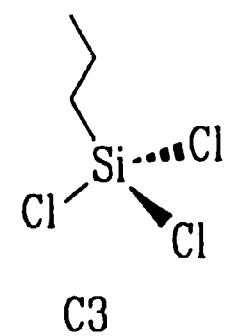
Figure 3A:
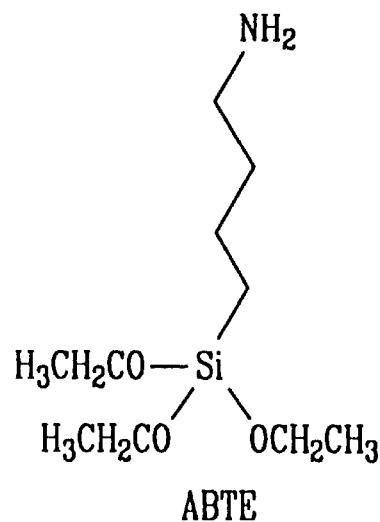
FIGS. 3a, b, c and d shows the structures of some hydrophilic silanes investigated for LC alignment. All have a —NH2 (amine) group at the end of the molecule and a trialkoxy silyl group at the other end.
Figure 3B:
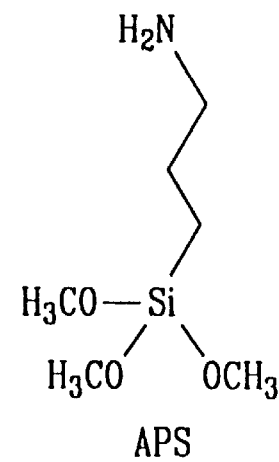
Figure 3C:
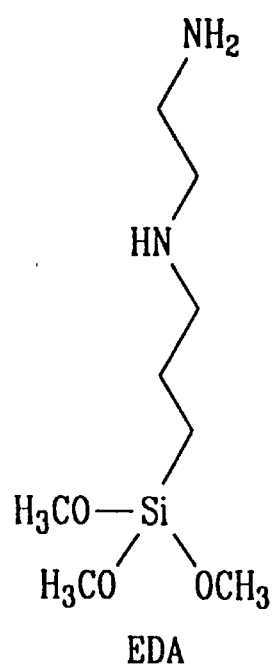
Figure 3D:
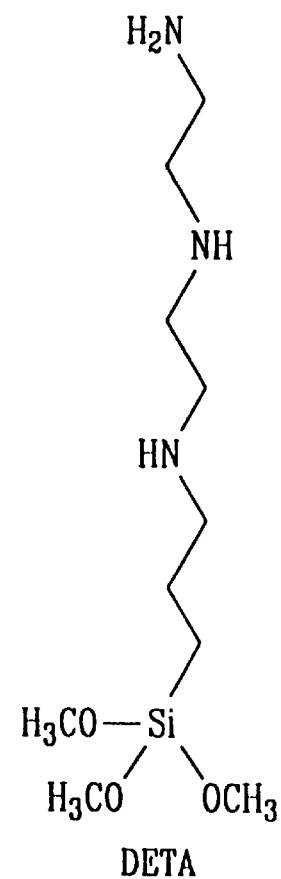
Figure 4A:
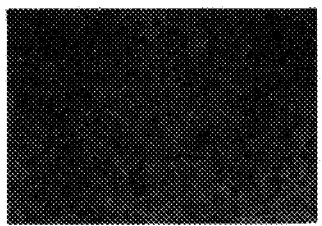
FIGS. 4a, b, c, d, e and f shows the optical textures obtained with E—63 on an ITO substrate treated with different hydrophilic silanes.
Figure 4B:
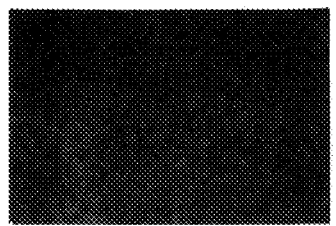
Figure 4C:
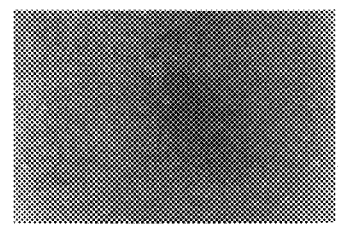
Figure 4D:
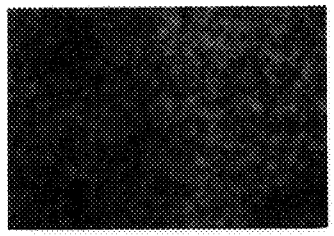
Figure 4E:
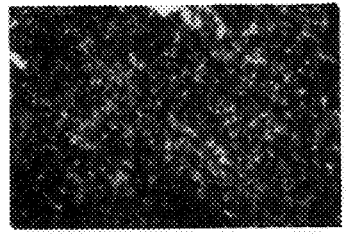
Figure 4F:
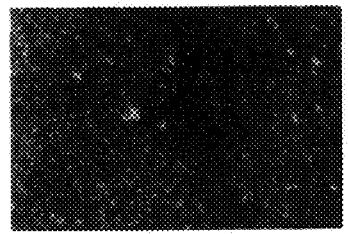

In addition to the silanes depicted in FIG. 1, other suitable X groups include any chemical functional group capable of sorption to the above-described surfaces. Chemical groups capable of covalently bonding to the substrate surface (chemisorption) are preferred. Examples include any group making an Si—O bond with a surface hydroxyl group including, for example, —SiR$_2$OH where R is $C_1$–$C_{10}$ alkoxy, —Si(OH)$_3$, and mono/di/trialkoxy silanes. Other examples of X include a carboxyl (COO) group; phosphorus-containing groups, a thiol group; an alcohol group; a carbonyl group; a (meth)acrylate group; titanates;

zirconates; a thiocyanate group; a (meth)acrylic acid group; an isocyanate group; an isothiocyanate group; an acyl cyanate group; an acyl thiocyanate group; etc., each x group being chosen so as to sorb to the desired substrate, preferably chemisorb. Where it is possible, the X group may be chiral (for example, a trialkoxysilane group having different alkoxy group).

It is also possible that a single layer-forming molecule of formula 1 can contain two or more of the above chemically functional X groups, and that one or more than one are used for sorption to the surface. Thus, n in the above formula can be an integer greater than 1, and is preferably from 1–4, most preferably 1 or 2. Further, X groups on different layer-forming molecules can bond to one another while others sorb to the substrate. See FIG. 1 where oligomers form through X groups.

S in the above formula is a spacer group. In addition to the spacer groups described in FIG. 3 (hydrocarbon chains and hydrocarbon chains interrupted by one or two NH groups) other spacer groups may be used. Suitable spacer groups include any chemical moiety that separates X from P and that does not prevent X and P from performing their functions. For example, suitable spacer groups include a single bond and a linear $C_1$–$C_{30}$ or branched $C_3$–$C_{30}$ alkyl group each optionally interrupted, when there are at least two carbon atoms, by one or more aromatic groups, peptide groups, heterocyclic groups, NH, NR where R is a $C_1$–$C_{18}$ hydrocarbon group, O, S, COO, oxygenated sulfur, i.e., $SO_n$ where n is 1–4, CO, phosphorous, oxygenated phosphorous such as phosphine, phosphate, phosphite, etc. group which are preferably non-adjacent. The spacer groups may be optionally substituted, for example, with hydroxyl, nitro, halogen, those substituents listed below, etc. Other suitable S groups include a $C_4$–$C_{70}$ aromatic group optionally substituted with alkyl, hydroxyl, nitro, halogen, etc., groups, a $C_3$–$C_{30}$ heterocyclic group optionally substituted with alkyl, hydroxyl, nitro, halogen, etc., groups, and a saturated or partially unsaturated $C_3$–$C_{30}$ cyclic hydrocarbon group optionally substituted with hydroxyl, halogen, nitro, etc., groups and including substituted and unsubstituted steroids like cholesterol, etc. It is stressed that any spacer which links X and P and does not negate their functions may be used.

The spacer of the present invention may be chiral. Preferably the spacer separates X from P by from 1 to 1000 angstroms, preferably 2 to 70 angstroms, most preferably 3 to 30 angstroms, including 5, 10, 15, 20 and 25 angstroms and all ranges therebetween, and is chemically tailored to provide a desired pretilt angle θ of preferably uniaxially oriented liquid crystal molecules in contact with the invention surfaces of from $0° \leq \theta \leq 90°$ (i.e., pure planar to homeotropic alignment).

A layer-forming molecule of formula 1 can bear more than one spacer group and preferably has as many spacers as there are directionally linkable groups. Thus, n is an integer of 1 or more, preferably 1–4, most preferably 1 or 2. n preferably is equal to or less than o (the number of P groups).

P in the above formula is a group capable of directionally linking to another P group. Directional linking includes dimerization, oligomerization, polymerization, photoreactions including insertions, isomerizations, Norish I and II reactions, etc. wherein at least two P groups are anisotropically linked. Groups capable of directional charge transfer interactions, ionic bonding, hydrogen bonding etc. are also included. P groups encompass all functional groups capable of being directionally (i.e., anisotropically) linked to another, preferably to a close-by or neighboring P group.

Figure 5:
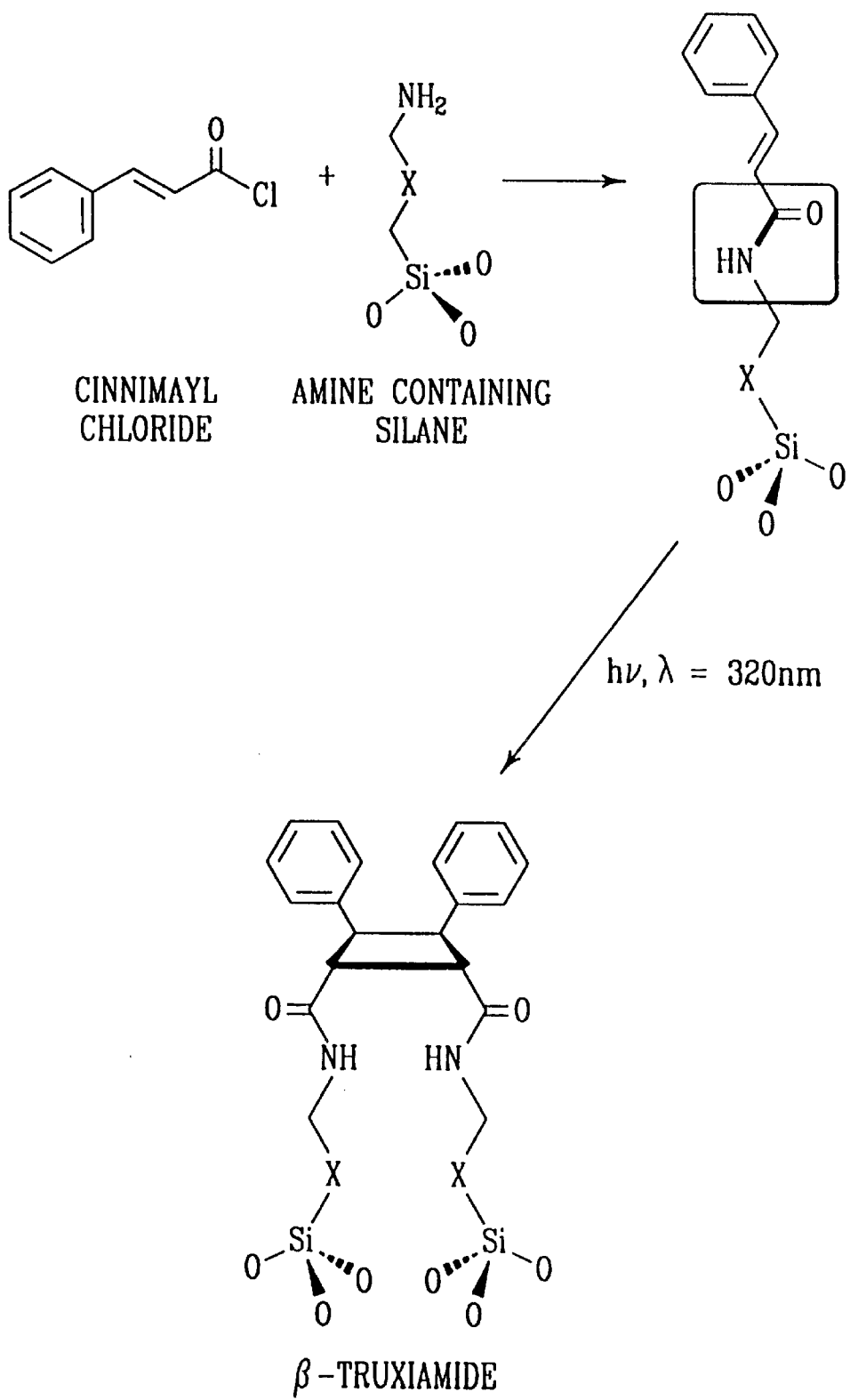
FIG. 5 is a schematic representation of one embodiment of the different steps involved in the invention alignment process, Step 2: optional modification of the chemisorbed silane (DETA, EDA, APS or ABTE) layer and attachment of the photopolymerizable group (cinnamoyl chloride); Step 3: Irradiation by polarized UV light and formation of oligomer pairs (β-truxiamides)

In addition to the cinnamoyl groups described in FIG. 5, any other suitable directionally linkable groups may be used including those depicted in FIG. 13 and any other group capable of directional linking to a neighboring P group by means of polarized radiation, electric polymerization, heat, surface manipulation with a scanning tunneling microscope, atomic force microscope, etc. These groups can directionally link in any fashion— meaning that anisotropic dimer formation, oligomer formation, polymer formation, charge transfer complexation, ionic attraction, etc. all produce useful surfaces providing LC alignment. In addition, the P–P' directional link may be chiral. Directional linking of P groups is preferably effected by circularly or elliptically polarized UV light. A preferred embodiment of the present invention is a surface coated with a chemisorbed layer of $[X]_m$—$[S]_n$—$[P]_o$ molecules which have been polymerized with polarized UV radiation to form mostly dimers. Preferred sorbable molecules according to the invention have m=n=o=1.

However, since a layer-forming molecule of the present invention can bear more than one P group, o may be an integer greater than 1. While each spacer preferably has one P group, more than one P group may be present on each spacer. Thus o is preferably greater than or equal to n and is preferably an integer of from 1–4.

When one layer-forming molecule of formula 1 has two or more P groups the P groups on a single molecule may be directionally linked to one another, or some or all of the several P groups on one molecule may be directionally linked to P groups on other molecules. With two or more P groups on a single molecule a combination of these effects can be used. For example, two P groups on one molecule can directionally link, followed by further directional linking with a P group on a neighboring molecule. By "neighboring" any molecule with a P group that reacts with the subject P group is meant.

The invention $[X]_m$—$[S]_n$—$[P]_o$ compounds are prepared by simple organic reactions well known to and within the skill of the ordinary artisan and explained in, e.g., *Introduction to Organic Chemistry*, A. Streitwieser and C. Heathcock, Macmillan, 1976; *Reagents for Organic Synthesis*, Fieser and Fieser, John Wiley and Sons, 1967 and succeeding volumes; *Survey of Organic Syntheses*, John Wiley and sons, Vols I and II, 1970; and *Advanced Organic Chemistry*, March, Wiley, 1985, all incorporated herein by reference.

The invention anisotropic surfaces may be made as thin as one layer of molecules of formula 1 or several multiples thereof. Any thickness is acceptable. A preferable thickness is 3 to 3000 angstroms. The invention surfaces can be prepared by processes including the electric poling, magnetic field, solvent flow, etc., alignment of $[X]_m$—$[S]_n$—$[P]_o$ molecules followed by directional linking with heat, light, chemical activation, etc., and are not limited to those produced by the process described below. Those surfaces produced by the below-described process are preferred.

The preferred process of the present invention comprises two or three steps: (i) formation of a sorbed, preferably chemisorbed, layer or layers of $[X]_m$—$[S]_n$—$[P]_o$ substrate (or $[X]_n[S]_m$ or $[X]_n$ molecules if desired), (ii) optional chemical modification of the sorbed molecules to provide at least one spacer group S and at least one directionally linkable group P therein if none is present prior to sorption and (iii) directional linking using any of the methods described above, preferably using polarized radiation, particularly polarized UV radiation. Step (ii) can be omitted if the material used in step (i) already comprises a spacer and directionally linkable group.

The three possible steps involved in the invention process are shown schematically in FIGS. 1 and 5. First a sorbed (preferably chemisorbed) layer or layers of molecules bearing no P group is placed on the surface of a substrate as a foundation, which is then rendered photosensitive by attachment of a P group (in this case, a UV chromophore). Finally, an anisotropic surface is created by photopolymerization with polarized UV light wherein the polymerizable groups of neighboring (presumably adjacent) molecules are bonded together, the direction of the polymerization being dictated by the polarization direction of the radiation. UV radiation, IR radiation, visible radiation etc., are included. The final result is a surface containing anisotropic molecular and, it is thought, geometric features whose direction dictates the direction of orientation for the long axis, or average director, of the liquid crystal molecules. Preferred methods of carrying out the invention steps are described below.

(i) Substrate Preparation:

The first stage of the invention sorption, preferably chemisorption, process preferably includes preparation of the substrate surface. This procedure applies to glass, ITO-coated glass, silicon wafers, etc. and is simply the cleaning of the substrate surface. In one ipreferred embodiment the substrate is sonicated twice in chloroform. Then the substrate is washed in 1:1 HCl/methanol for 30 minutes (a step that is omitted for ITO-coated glass), followed by 3× rinsing with distilled water. It is then washed in concentrated $H_2SO_4$ for 30 minutes and again rinsed three times with distilled water. The substrate is heated in distilled water to 80–100° C. for about 5 minutes then cooled. After such treatment the substrate is ready for chemisorption, adsorption, absorption, etc. of compounds of general formula $[X]_m$—$[S]_n$—$[P]_o$ or $[X]_m$—$[S]_n$ or $[X]_m$ if no polymerizable group or spacer is present.

(ii) Attachment of the sorbed layer

A solution for adsorption, absorption, chemisorption, etc. may be prepared or other art known methods of sorption may be used. A typical preferred chemisorption solution contains 1% by volume of the desired chemisorbable material, 5% by volume distilled water and 94% by volume of a 1 mM acetic acid solution in methanol. The substrate to be treated is dipped in this solution and allowed to stand for 5–15 minutes at room temperature. The solution is then poured out, and the substrate rinsed 3× with fresh methanol. The substrate may then be baked at 120° C. for 15 minutes to dry. The chemisorbable molecules become chemically bonded to the surface: i.e., the molecules are covalently bonded thereto. The chemisorbed layer is then ready for chromophore attachment, if no chromophore is present in the material in the first place. The layer can be sorbed in a particular pattern.

Figure 6A:
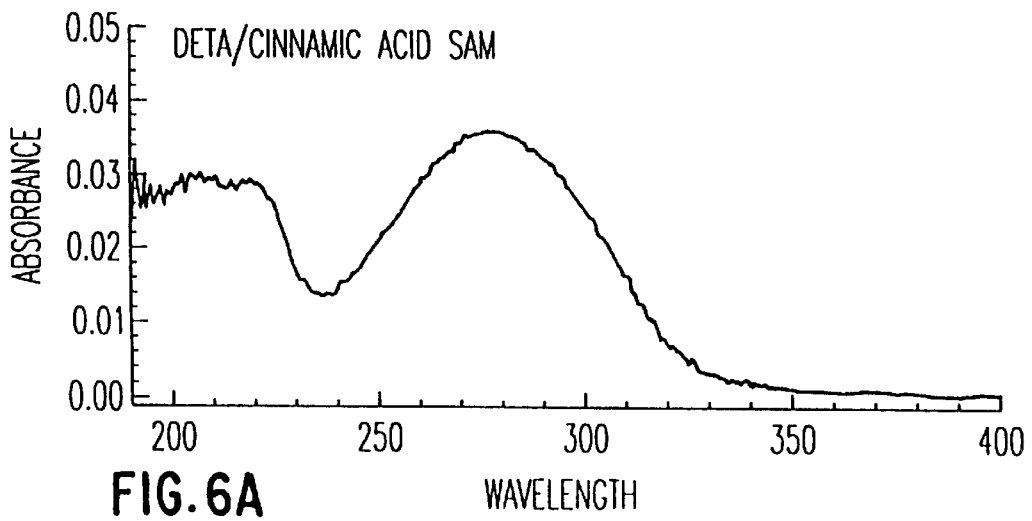
FIGS. 6a, b and c is the UV absorption spectra of the chemisorbed silane layer after attachment of the cinnamoyl chloride unit. (a) DETA, (b) EDA and (c) ABTE.
Figure 6B:
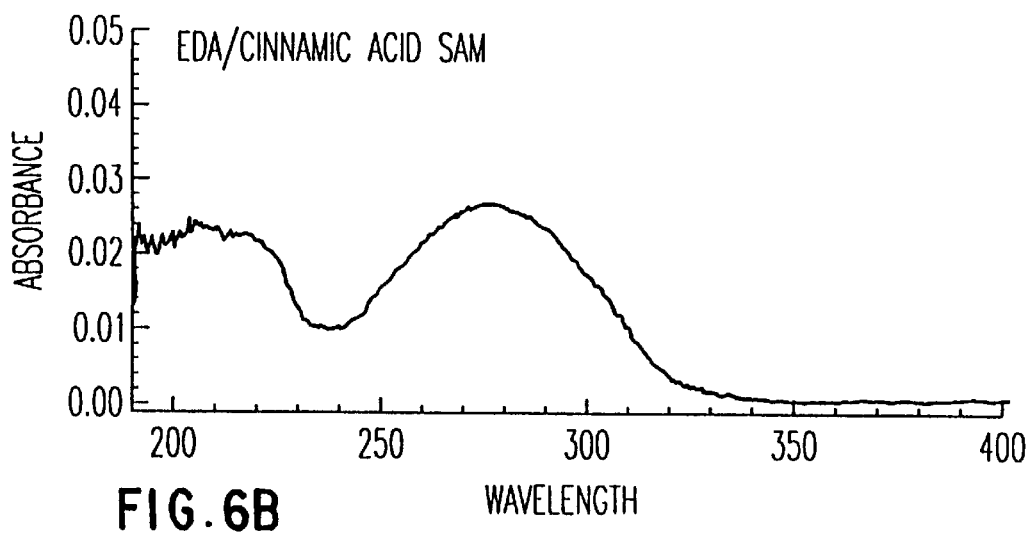
Figure 6C:
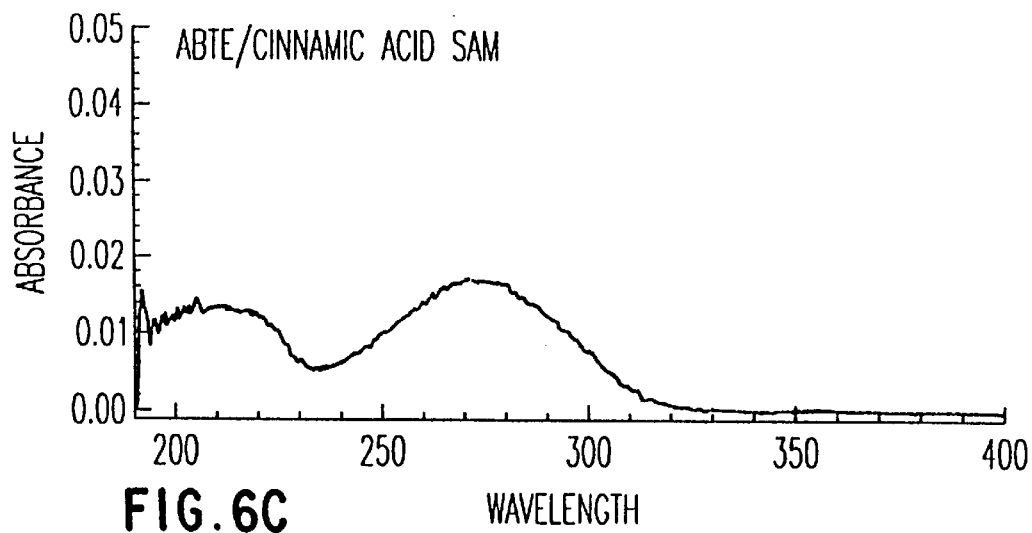

(iii) Attachment of the Spacer and Directionally Linkable Group to the Initially Sorbed Layer:

In this step (optional since the molecule absorbed, adsorbed, chemisorbed to the surface in (ii) above may already possess a spacer and a polymerizable group) a directionally linkable group and, if desired, a spacer other than a single bond is attached to the sorbed layer. The substrate with the sorbed layer is immersed in a solution containing a compound with, e.g., a spacer bonded to a directionally linkable group and a chemically reactive group for reaction with the initially sorbed layer, like cinnamoyl chloride. Acetonitrile can be used as the solvent. The substrate is then allowed to stand in the solution for one hour in the dark. This ensures attachment of the spacer and, e.g., polymerizable chromophore to the sorbed layer. In four specific embodiments using APS, ABTE, EDA and DETA, cinnamoyl chloride chemical modification was ascertained by the UV absorption peak seen at 275 nm (see, e.g., FIG. 6). The directionally linkable group, etc., can be provided in a pattern if so desired.

Figure 7:
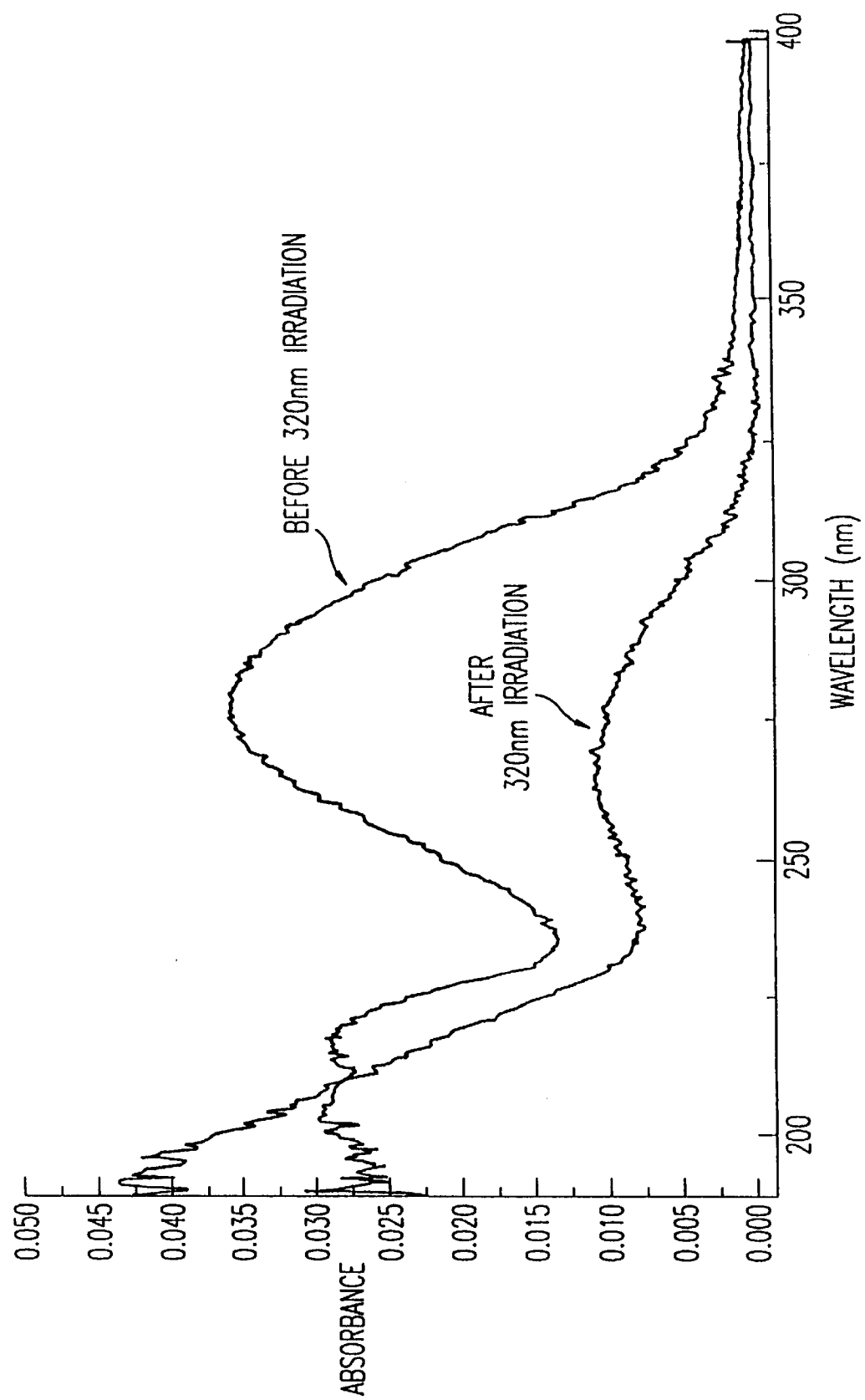
FIG. 7 is the UV absorption spectra of the chemisorbed silane layer before and after photopolymerization.
Figure 9A:
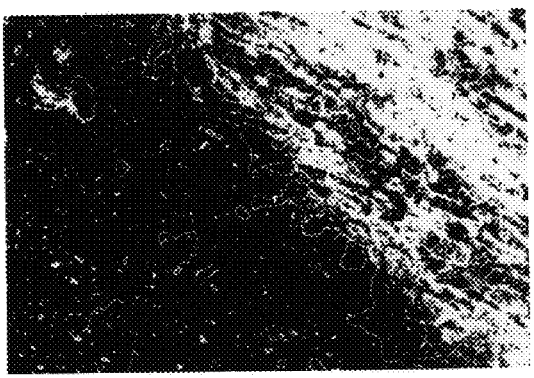
FIGS. 9a and b shows the liquid crystal alignment in a twisted nematic (TN) cell comprising directionally linked surfaces coated on substrates. The base substrates consist of bare ITO glass. Both directionally linked and non-linked coated regions are shown. The liquid crystalline (LC) molecules are aligned in a uniform planar orientation in the directionally linked regions.
Figure 9B:
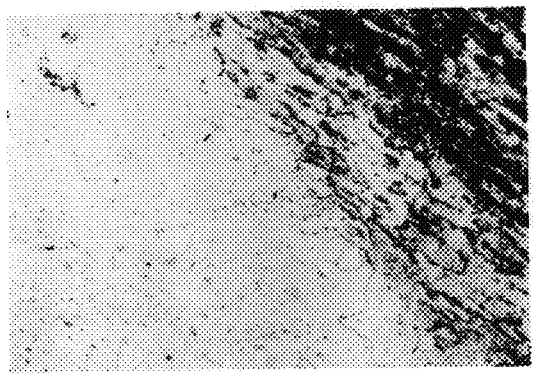

(iv) Directional Linking:

The last step of the invention process is directional linking, preferably directional dimerization, oligomerization, polymerization, etc. Directional oligomerization, dimerization and polymerization are preferred. In one preferred embodiment a substrate with a photopolymerizable chemisorbed layer is irradiated with polarized UV radiation to obtain an anisotropic surface. A typical dosage of UV radiation is about 3 J/cm² for about 15 minutes. As the skilled artisan knows, the time varies with lamp intensity, closeness of the substrate to the lamp, etc. This treatment leads to a photo-induced reaction between photopolymerizable or photodimerizable groups of, presumably, adjacent chemisorbed molecules, forming thereby a cyclobutane ring (in the case of cinnamic acid polymerizable derivatives). See FIG. 5. The existence of these β-truxiamide pairs was ascertained by UV absorption spectra: photopolymerization resulting in the dimer pair formation results in a drastic reduction in the peak at 275 nm and an increase in UV absorbance at 193 nm due to the presence of cyclobutane rings (FIG. 7). Patterning can occur by linking using a pattern of light passed through a mask, etc.

While not being bound by a particular theory, formation of the directionally linked surface is believed to result in a highly anisotropic surface. The polymerization structure, or perhaps more correctly in the case of cinnamic acid derivatives, the directionally dimerized structure, is believed to be oriented in a single preferred direction, dictated by the direction of the polarization of the light used to effect directional linking. The invention process thus creates a permanent, bound anisotropic surface layer on a substrate by a process which does not involve any rubbing or any guest-host interaction. The invention surface is stable to, e.g., heat and light, maintaining orientation of liquid crystalline molecules in contact therewith even after exposure to high temperature or UV radiation for extended periods. Depending on the compound of formula 1 used, the invention surface can be colorless or colored, showing absorption in the visible range of from 0% to 100%.

EXAMPLES

Example 1

Trichlorosilanes depicted in FIG. 2 containing different lengths of saturated hydrocarbon chains were covalently attached to glass surfaces by dipping the glass in a solution containing the silanes. The solution was 5% water, 94% 1 mm solution of acetic acid in MeOH and 1% (vol/vol/vol) of silane. The resulting layers were hydrophobic with water contact angles in the range of 75–90°.

The alignment of a commercially available room temperature nematic liquid crystal (E-63 from Merck) containing a mixture of alkyl cyanobiphenyls and having the following LC transition temperatures K-8° C.-N-84° C. -I in contact with the chemisorbed layers of these hydrophobic silanes was investigated, and the orientation obtained was homeotropic (i.e., perpendicular to the substrate surface). Liquid crystal mixture E7 from Merck containing —$C_5$, —$C_7$ and —$OC_8$ substituted cyanobiphenyls and —$C_5$ substituted cyanotriphenyl can also be used, as can any material, composition, etc. exhibiting anisotropy, preferably liquid crystallinity.

Example 2

Experiment 1 was repeated with the exception that the silanes studied were 4-aminobutyltriethoxy silane (or ABTE), N-(2-aminoethyl)-3-aminopropyl trimethoxy silane (or EDA) trimethoxysilylpropyldiethylenetriamine (or DETA) and 3aminopropyl trimethoxy silane (or APS). See FIG. 3. All four silanes have a polar —NH$_2$ group at the free end of the molecule. This group modified the hydrophilicity of the substrate surface after attachment of the molecule. EDA and DETA contain, in addition to the terminal amine group at the end, one or two additional amine groups as bridging groups linking the hydrocarbon chains. This permits the variation of the degree of hydrophilicity and/or the strength of the dipolar interactions.

The four amine silanes were chemisorbed on ITO-coated glass surfaces, and a common sandwich cell was made using liquid crystal mixture E-63 from Merck. Both glass surfaces of the cell in contact with the LC had aligning chemisorbed layers. The cells were examined on a rotating stage of a microscope with a light source. The LC cell was placed between crossed polarizers within the microscope.

FIG. 4 shows photographs of the textures exhibited by E-63 under crossed polarizers. In the top row of photographs the average director of the LC is at an angle of 45° to the polarizer or analyzer while in the bottom row of photographs, the director is parallel to either of them. Acceptable planar alignment was seen for all chemisorbed layers.

Example 3

APS, ABTE, EDA and DETA layers were chemisorbed on plane glass according to the process described above and cinnamoyl groups were provided thereon as polymerizable group P according to (iii) above. The layers were directionally polymerized as described above with UV light. In order to compare the alignment obtained in the directionally polymerized (DP) treated region with that in a non-polymerized region, a mask was used to directionally polymerize only part of the chemisorbed layer. A 10 $\mu$m thick cell was prepared with E-63 sandwiched between two directionally linked surface-treated substrates. All observations were made between crossed polarizers and the cell was mounted on the rotating stage of a polarizing microscope.

The LC molecules were found to be aligned extremely well in a uniform planar configuration in the invention surface region while there was hardly any alignment in the unpolymerized regions, the line of demarcation being very sharp. FIG. 8 shows photographs for two positions of the sample, i.e., when the LC director is at 45° or parallel to the axis of the polarizer/analyzer. The DP region is uniformly dark in the latter case while it is uniformly bright in the former case. The quality of the alignment was so good that even under high magnification few defects were seen in the invention surface region.

The particular set-up used was either a Nikon Optiphot Polarizing Microscope with a 100 W white light source and 12 V DC power supply, a Nikon photodiode, a Melles Griot amplifier (for the optical signal) and a Keithley digital multimeter (199 system DMM) receiver or an Olympus BH-2 Polarizing Microscope with a 100 W white light source, 12 V DC power supply, UDT photodiode, and UDT Optometer model 5370 with built-in amplifier. Both set-ups used a Wavetek model 395 synthesized arbitrary waveform generator and Trek model 50/750 amplifier to apply the electric field to the samples. In all cases, excellent contrast ratios were obtained with the invention surface.

Example 4

Alignment surfaces were prepared in accordance with Example 1 on bare ITO coated glass surfaces. A cell was made with E-63 in a twisted nematic configuration so that the LC was in direct contact on both sides with DP treated substrates mounted such that the direction of polymerization for the two substrates was orthogonal to each other. This resulted in a twisted nematic (TN) cell with good alignment, as seen in FIG.

The Figure shows the cell between parallel and between crossed polarizers. Once again, the invention treated region gave a uniform planar alignment while the untreated region showed no alignment. It was noted, however, that the quality of alignment on ITO was, in general, not as perfect as it was on plain glass. This is believed to be due to inherent surface inhomogeneities on the ITO surface.

Example 5

ITO coated glass overcoated with a SiO$_2$ layer was studied in the same fashion as in Example 1. These substrates are typical of those used by the display industry. ITO glass (225 ohms/square surface resistance) coated with 690 Å of SiO$_2$ (purchased from Donnely Corporation) was used.

Figure 10A:
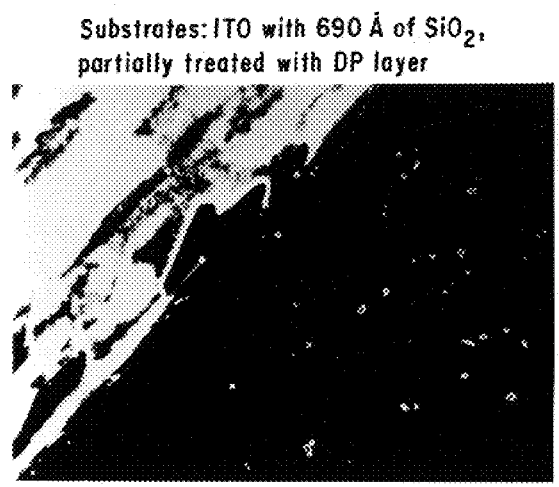
FIGS. 10a and b shows the liquid crystal alignment in a twisted nematic cell comprising directionally linked surfaces coated on substrates. Base ITO-coated glass substrates are first coated with a passivation layer of $SiO_2$ which is 690 Å thick. Both directionally linked and nonlinked regions are shown. The LC molecules are aligned in a uniform planar orientation in the polymerized regions.
Figure 10B:
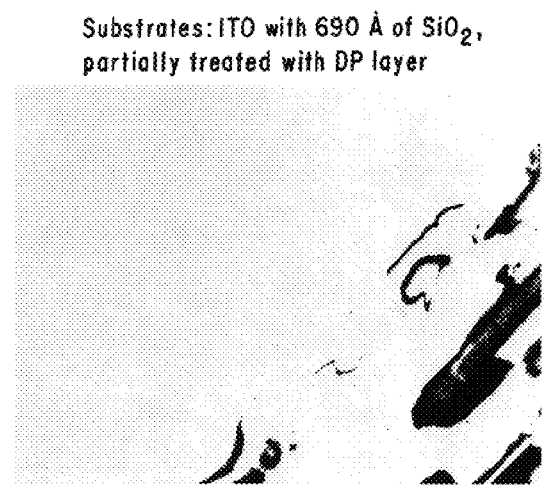

The passivated ITO was subjected to treatment under exactly the same conditions as in Example 3 using APS with a cinnamoyl group. A sample cell with the directionally linked treated passivated ITO surfaces was prepared in a TN configuration. Excellent alignment was obtained in the invention surface regions (FIG. 10). In fact, the aligned regions were defect-free even when observed with increased magnifying power. The contrast ratio was very high and comparable to that of commercial TN cells of the same thickness. While contrast ratios vary with the equipment used to measure them, we obtained ratios >9 and as high as about 33.

Example 6

X-S-P molecules (n=m=o=1) are chemisorbed on aluminum oxide as in Example 1. P here is acrylate, S is C$_{10}$ alkyl, and X is carboxyl. Directional polymerization as in Example 3 is effected.

Example 7

X-S-P molecules (n=m=o=1) are chemisorbed on a gold surface by dissolving the molecules in solvent and applying the solution to the gold surface for 24 hours. X here is a thiol group, S is a parasubstituted bicyclohexyl group and P is a styrenyl group. Directional polymerization as in Example 3 is effected.

In this manner, we have shown that directional linking results in surfaces which provide uniform planar alignment on substrate surfaces including glass, ITO and passivated ITO surfaces. Electrooptic studies on two TN cells made from ITO and passivated ITO surfaces with directionally linked alignment layers will now be described.

Example 8

Figure 11:
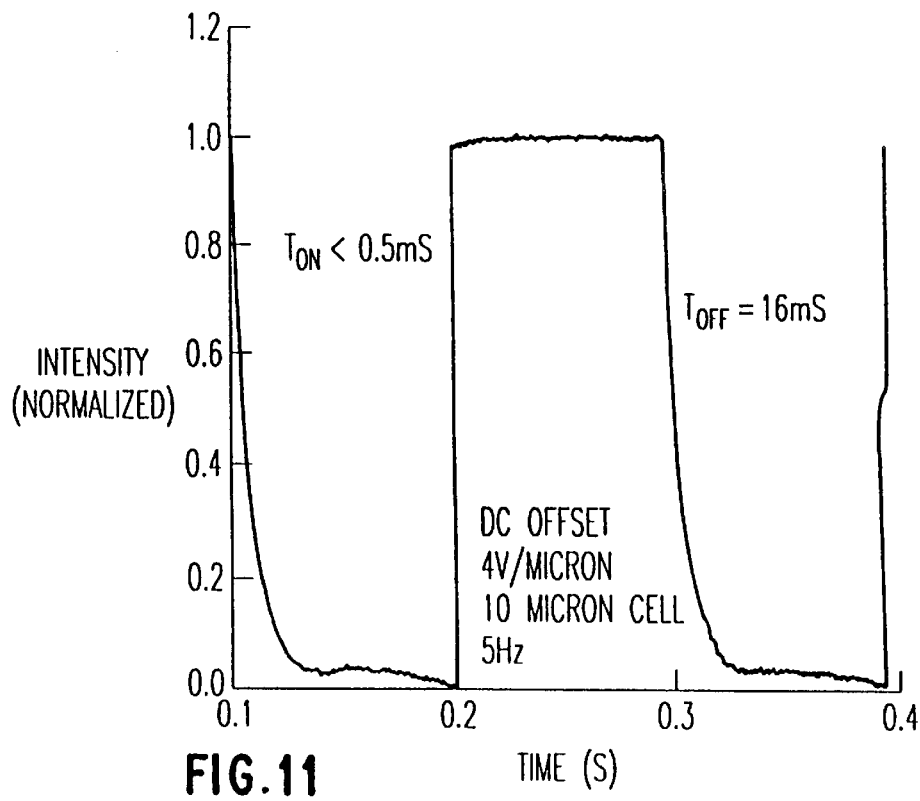
FIG. 11 shows the electrooptic characteristics of a TN cell with a directionally linked coating on the substrates. The underlying substrates consist of bare ITO glass.
Figure 12:
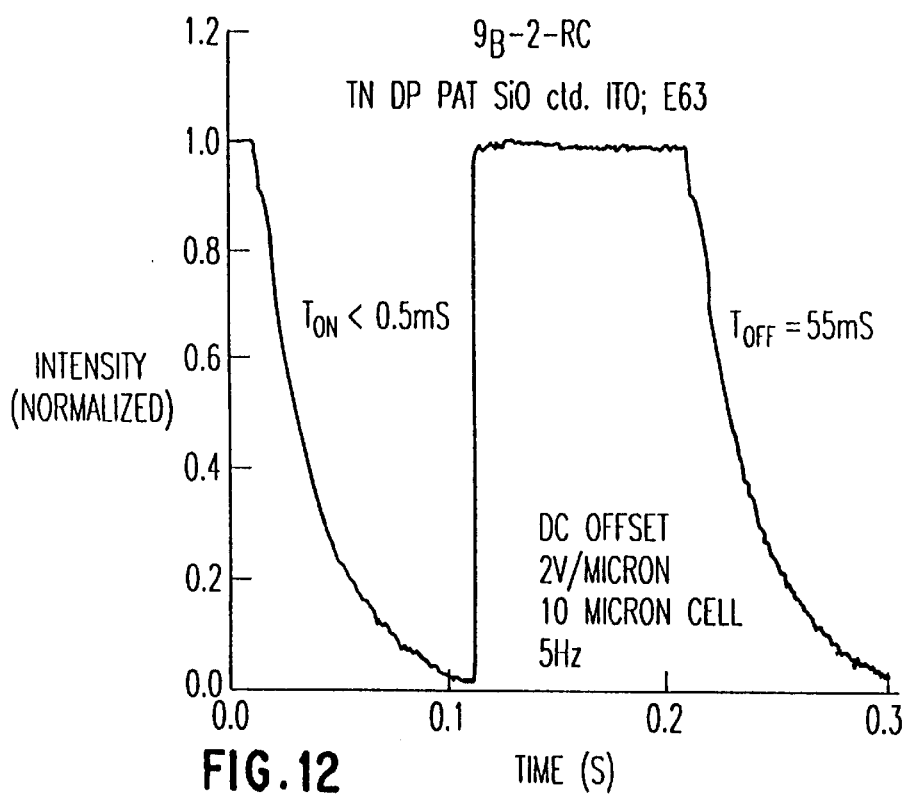
FIG. 12 shows the electrooptic characteristics of a TN cell with a directionally linked coating on the substrates. The underlying substrates consist of passivated ITO.
Figure 13A:
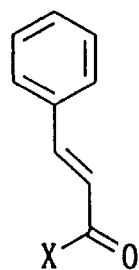
FIGS. 13a–k shows some of the many alternative directionally linkable groups useful in the present surface and method. X represents an absorbable, adsorbable, chemisorbable, etc., end of the molecule. The spacer here is a single bond.
Figure 13B:
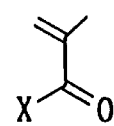
Figure 13C:
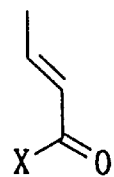
Figure 13D:
Figure 13E:
Figure 13F:
Figure 13G:
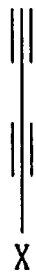
Figure 13H:
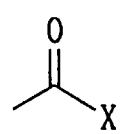
Figure 13I:
Figure 13J:
Figure 13K:
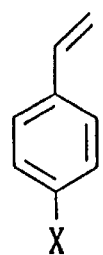

Two 10 micron thick TN cells with invention aligning surfaces on bare ITO in one case and passivated ITO in another case were prepared. The chemisorbed material used was ABTE (bare ITO) or APS (passivated ITO) both with cinnamoyl P groups. The electrooptic characteristics of the two cells are shown in FIGS. 12 and 13, respectively. In both cases the invention surface treatment provides sufficient anchoring for the functioning of a TN device. The on-time for both cells is very fast (<0.5 ms) and comparable to commercial TN cells. The off-times were 16 ms for bare ITO (FIG. 11) and 55 ms for passivated ITO (FIG. 12).

Thus, the present inventors have demonstrated that the invention anisotropic alignment surfaces yield uniform homeotropic or tilted and non-tilted planar alignment of compounds on substrates. The preferred invention process is a very simple process and effective for different substrate surfaces. Also, the aligning layer is heat- and light-stable, can be made colorless, provides excellent contrast, few to no defects, may be made very thin and may be chemically bonded to the substrate. The present process has several important features: it is a simple, largely room temperature process which is easy to scale-up for manufacture, in a preferred embodiment it yields a chemically bonded alignment layer ensuring long term stability, and is applicable to substrates used in twisted nematic devices, super-twisted nematic devices, active matrix devices, etc.

The invention alignment surfaces are useful in all optical recording media and devices and, in particular, in liquid crystal devices (LCD) which require aligning substrates. These devices include displays, spatial light modulators, phase shifting devices, non-linear optical devices, twisted nematic devices, supertwisted nematic devices, double layer supertwisted nematic devices, triple layer supertwisted nematic devices, active matrix displays, multiplexed versions of the above-described devices, etc. Of course, flat panel displays, TV screens, computer screens, etc. are included. These devices are all well known in the art, and several of these devices are described in *Handbook of Display Technology*, Castellano J. A., Academic Press, Inc., 1992, incorporated herein by reference. Chapter 8 of this handbook is particularly useful. The art worker can provide the above-listed LC devices according to the present invention by simply substituting the surface alignment layer described herein for the alignment layer(s) used in prior art devices. Tilt angles provided by the invention surfaces vary from 0° to 90°, and are preferably from greater than zero to 15°, including 1, 2, 3, 4, 5, 6, 7, 8, 9, 10, 11, 12, 13, 14 and 15°. 20°, 30°, 40°, 45°, 50°, 60°, 70°, 80° and 85° tilts may also be provided, as well as all values and ranges therebetween.

In devices that require display areas with patterns, etc., the above surfaces can be directionally linked through a mask, etc., to provide only certain areas with the invention aligning surface, or compounds of formula 1 can be applied to only certain areas of a substrate. Further, a mask may be used to directionally link certain areas using, e.g., polarized UV light polarized in a first direction followed by directionally linking other areas of the same substrate with, e.g., polarized UV light which is polarized in a second direction. Multi-domain pixels may be made in this fashion, etc. Of course, mixtures of compounds of formula 1 can be used on a single substrate, and substrates with domains of different compounds of formula 1 can be used. Colored substrates can be used, as well as colored, fluorescent, etc. compounds of formula 1 made so by their chemical constitution. Additives such as dyes, etc. can be added to the invention layers before or after directional linking.

The liquid crystal materials oriented by the invention surfaces are not particularly limited and include those exhibiting nematic, cholesteric, smetic, discotic, etc. phases, including ferroelectric materials (particularly those with lateral fluorine substitution). The liquid crystals may be used singly or in mixture, including eutectic mixtures. Superfluorinated nematic mixtures may be used. Compositions of two or more different liquid crystals are preferred. Examples of liquid crystals and their mixtures are described in *Liquid Crystals in Tabellen*, Vols. I and II incorporated herein by reference, in U.S. Pat. No. 5,032,009, incorporated herein by reference, etc. Guest host compositions are also included wherein mixtures of liquid crystal(s) with, e.g., dyes, non-linear optical compounds, etc. are provided.

In particularly preferred embodiments of the present invention the aligning surface is chiral, whether because formula 1 molecules are chiral, the P–P' linkage is chiral, X is chiral, P is chiral, S is chiral, combinations of these, etc. Form and geometrical chirality are included.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of The United States is:

1. A compound of the formula

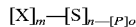

wherein X is a chemical functional group capable of chemisorption to a substrate and selected from the group consisting of —Si(OH)$_3$, —SiR$_2$OH, or SiR$_3$ where R is a C$_{1-10}$ alkoxy group; S is a member selected from the group consisting of a single bond;

a linear C$_{1-30}$ alkylene group;

a linear C$_{2-30}$ alkylene group interrupted by one or more aromatic groups, peptide groups, heterocyclic groups, NH, NR where R is a C$_1$–C$_{18}$ hydrocarbon group, O, S, COO, So$_n$ where n is 1–4, CO, phosphorous, phosphine, phosphate, or phosphite groups;

a branched C$_{3-30}$ alkylene group; or a branched C$_{3-30}$ alkylene group interrupted by one or more aromatic groups, peptide groups, heterocyclic groups, NH, NR where R is a C$_1$–C$_{18}$ hydrocarbon group, O, S, COO, So$_n$ where n is 1–4, CO, phosphorous, phosphine, phosphate, or phosphite groups;

P is a member selected from the group consisting of:

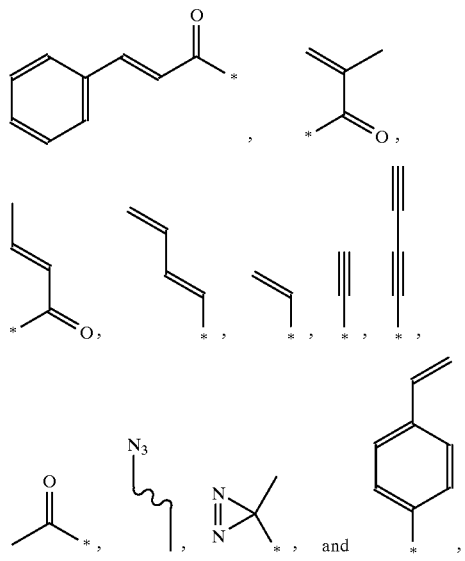

where * indicates the attachment to S; and n, m and o are all integers greater than or equal to I wherein m≧n and o≧n.

2. The compound of claim 1 where m=n=o=1.

3. A composition comprising:
(a) a solvent comprising water and methanol; and
(b) a compound of the formula:

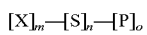

wherein X is a chemical functional group capable of chemisorption to a substrate and selected from the group consisting of —Si(OH)$_3$, —SiR$_3$ OH, and SiR3 where R is C$_{1-10}$ alkoxy group S is a member selected from the group consisting of a single bond; a linear C$_{1-30}$ alkylene group; a linear C$_{2-30}$ alkylene group interrupted by one or more aromatic groups, peptide groups, heterocyclic groups, NH, NR where R is C$_{1-C8}$ hydrocarbon group, O, S, COO, SO$_n$ where n is 1–4, CO, phosphorus, phosphine, phosphate or phosphate groups;

P is a member selected from the group consisting of:

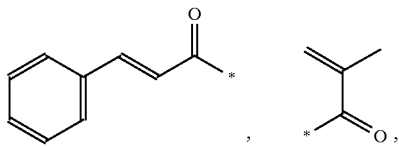

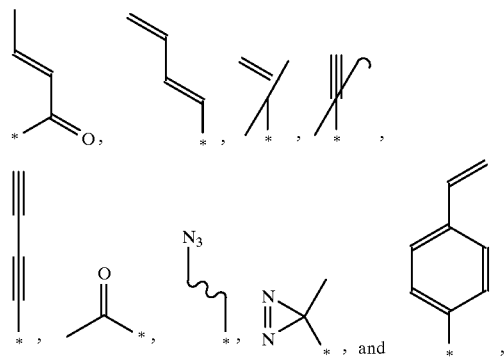

where * indicates attachment to S; and n, m and o are all integers greater or equal to 1 wherein m≧n and o≧n.

4. A composition of claim 3 wherein n =1.
5. A composition of claim 3 wherein m=n=o=1.
6. A composition of claim 3 wherein the compound is a condensation product of cinnamoyl chloride with a compound selected from the group consisting of 4-aminobutyltriethoxysilane, N-(2-aminoethyl)-3-aminopropyltrimethoxysilane, trimethoxysilylpropyldiethylenetriamine, and 3-aminopropyltrimethoxysilane.

* * * * *